Aug. 9, 1966     H. E. ROSENBERGER     3,264,938
LOW POWER OPTICAL SYSTEM FOR MICROSCOPE
Filed Jan. 10, 1963     2 Sheets-Sheet 1

SPECIMEN SURFACE 12

| MAGNIFICATION = 10 X    NUMER. APERT. = .030 | | | | | |
|---|---|---|---|---|---|
| LENS | FOCAL LGTH. | RADII | THICKNESS | SPACES | $n_D$ | $V$ |
| I | $F_I = 24.044$ | $R_1 = 37.670$ | $t_1 = .9$ | $S_1 = 33.3$ | 1.720 | 29.3 |
| | NEG. = −30.3 | $R_2 = 13.677$ | | $S_2 = 13.1$ | 1.517 | 64.5 |
| | POS. = 13.052 | $-R_2 = 13.677$ | $t_2 = 2.3$ | $S_3 = 40.0$ | | |
| II | $F_{II} = 29.695$ | $R_4 = 15.560$ | $t_3 = 3.1$ | $S_4 = 24.3$ | 1.524 | 59.5 |
| | | $R_5 = \infty$ | | | | |
| III | $F_{III} = 20.168$ | $R_6 = 10.568$ | $t_4 = 2.0$ | $S_5 = 20.2$ | 1.524 | 59.5 |
| | | $R_7 = \infty$ | | | | |

INVENTOR.
HAROLD E. ROSENBERGER
BY Frank C. Parker
ATTORNEY

FIG. 3a   (NOMINAL VALUES)   FIG. 3b (.9 NOMINAL VALUES)

INVENTOR.
HAROLD E. ROSENBERGER
BY Frank C. Parker
ATTORNEY

United States Patent Office 3,264,938
Patented August 9, 1966

3,264,938
LOW POWER OPTICAL SYSTEM FOR MICROSCOPE
Harold E. Rosenberger, Brighton, N.Y., assignor to Bausch & Lomb Incorporated, Rochester, N.Y., a corporation of New York
Filed Jan. 10, 1963, Ser. No. 250,530
2 Claims. (Cl. 88—57)

The present invention relates to an optical system for a microscope and more particularly relates to improvements in low power optical systems therefor.

It is an object of the present invention to provide an improved and novel optical system of substantially 10× magnification and .030 N.A. for a microscope, said system being simple in form and of low cost but nevertheless capable of excellent optical performance as judged by the state of correction of the chromatic and spherical aberarations, coma, astigmatism and field curvature.

Figures 1, 2:
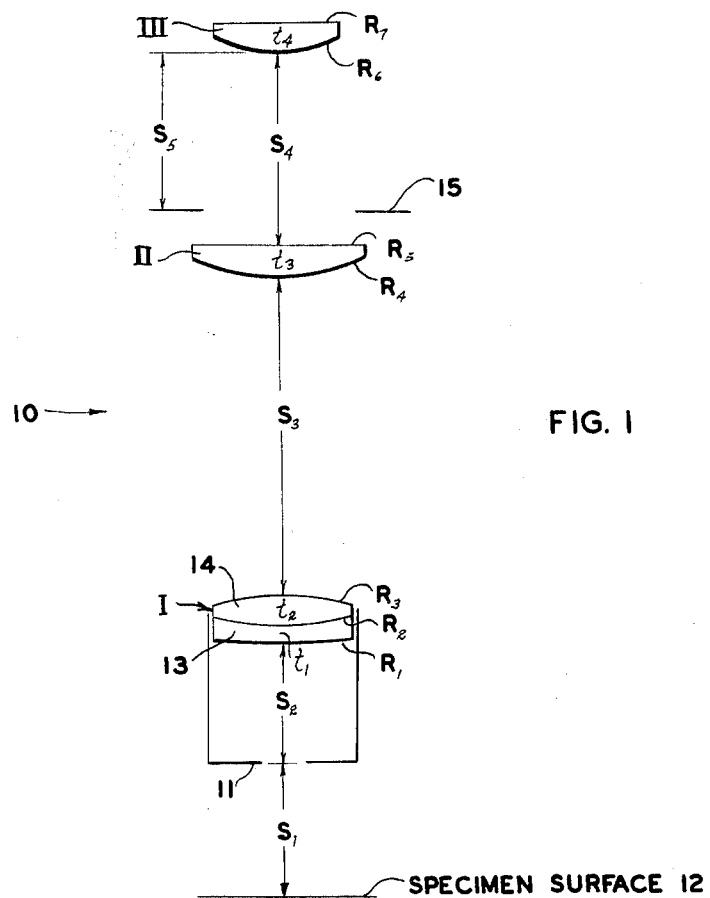

Further objects and advantages will be apparent to those skilled in this art from a study of the specification following herebelow, taken together with the accompanying drawing, wherein:

FIG. 1 is an optical diagram of an optical system constructed according to the present invention; and FIG. 2 is a chart of numerical values related to the constructional data of a preferred form of said invention.

Said optical system is generally designated by numeral 10 in the drawing and includes a compound lens designated I and a front diaphragm 11 which is mounted at a fixed axial distance $S_2$ in front of lens I so as to control the image aberrations due to off-axis rays. The lens I and its diaphragm 11 constitute a microscope objective and are mounted at a fixed axial distance $S_1$ rearwardly of a specimen surface 12. Compound lens I is composed of a front negative meniscus lens element 13 having a concave rear surface, and a rear double convex lens element 14 in contact with the last-named surface.

Optically aligned with the compound lens I and rearwardly thereof, is located a pair of singlet substantially plano-convex lenses II and III in optical alignment and spaced relation with each other, said lens II being spaced from lens I at an axial distance which is designated $S_3$ and lenses II and III being spaced apart by an axial distance which is designated $S_4$. Between lenses II and III is provided an eyepiece diaphragm 15 which is located at an axial distance $S_5$ forwardly of lens III at the image plane formed by the aforesaid objective and lens II.

According to the present invention, the aforesaid objects are achieved by establishing favorable values for all of the optical parameters of the system through calculation and experiment. A set of favorable values as determined by the inventor of the present invention is given in the table of mathematical statements herebelow wherein the focal lengths of the successive lenses I to III are designated $F_I$ to $F_{III}$, the successive radii of the lens surfaces of said lenses are designated $R_1$ to $R_7$, and the minus (—) sign used with certain R values applies to any lens radius having its center of curvature located on the object side of the vertex of the surface involved, $S_1$ to $S_5$ represent the axial distances between the parts of the optical system 10 as aforesaid, $t_1$ to $t_4$ designate the axial thicknesses of the successive lens parts, $n_D$ and $\nu$ represent the refractive index and Abbe numbers resepctively, and K is a symbol representing half of the over-all axial length of the optical system from said specimen surface 12 to the rear surface of lens III, $.384K < F_I < .424K$    $.601K < R^1 < .665K$
$.474K < F_{II} < .524K$    $.219K < R_2 < .242K$
$.322K < F_{III} < .356K$    $.219K < -R_3 < .242K$
                                   $.249K < R_4 < .275K$
                                   $R_5 > \pm K$
$.532K < S_1 < .588K$    $.169K < R_6 < .187K$
$.209K < S_2 < .231K$           $R_7 > +K$
$.638K < S_3 < .706K$    $.0143K < t_1 < .0159K$
$.388K < S_4 < .428K$    $.0368K < t_2 < .0406K$
$.322K < S_5 < .356K$    $.0495K < t_3 < .0547K$
                                 $.0319K < t_4 < .0353K$ Lens I (13) (Neg. Elem.)      $n_D = 1.715$ to $1.725$
                                        $\nu = 27.0$ to $31.5$
Lens I (14) (Pos. Elem.)      $n_D = 1.512$ to $1.522$
                                        $\nu = 62.0$ to $67.0$
Lens II      $n_D = 1.522$ to $1.526$
                                        $\nu = 57.0$ to $62.0$
Lens III      $n_D = 1.522$ to $1.526$
                                        $\nu = 57.0$ to $62.0$ The limits of the aforesaid favorable values for the lens parameters as set forth in the table hereabove are chosen to be well within the values which are found to produce a successful optical system as shown in the performance curves in FIGS. 3a to 4b of the drawings. FIG. 3a shows the aberration condition of axial rays when using the given nominal values for all of the parameters of the optical system, the aberration being shown in Airy disc units at various off-axis heights in millimeters in the plane of the exit pupil of the optical system 10. FIG. 3b consists of a group of three curves which represent the departure from optimum condition of field rays when plotted in the same maner as the axial rays of FIG. 3a, the three curves representing the full field, .7 field and half field conditions.

Figure 4A:
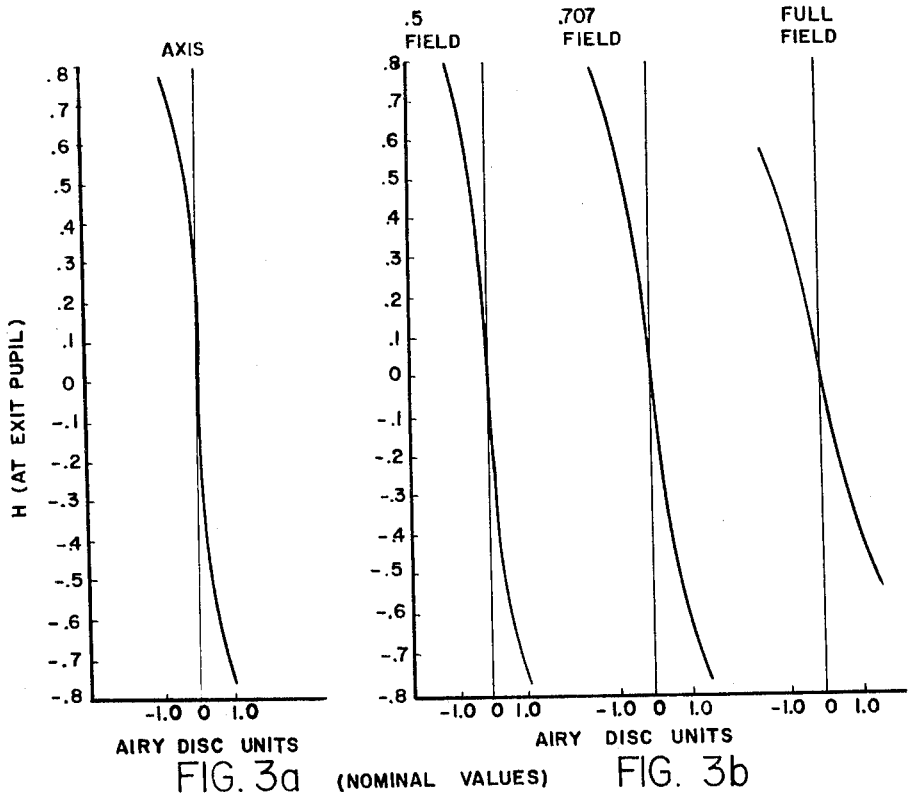

FIG. 4a is similar to FIG. 3a and shows the aberration condition of axial rays when the parameters of the optical system 10 are reduced 10%. Correspondingly, FIG. 4b is similar to FIG. 3b and shows the aberration for the field rays with respect to a full field, a .7 field and half field at the exit pupil of the optical system 10.

Figure 4B:
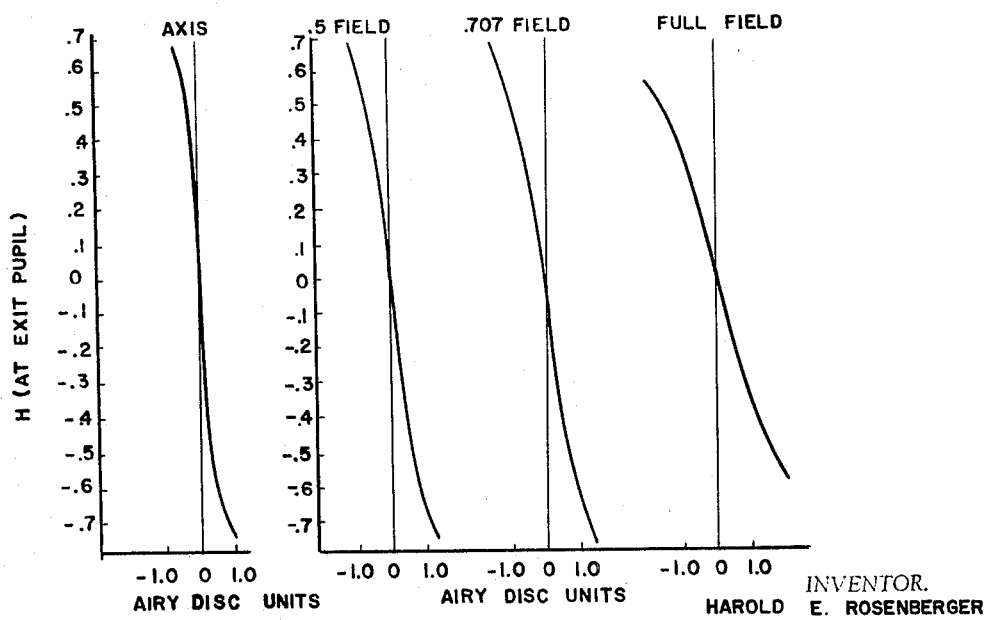

It will be observed by comparing the curve in FIG. 3a with the curve in FIG. 4a, and by comparing the three curves of FIG. 3b with the three curves of FIG. 4b, that a change of as much as 10% in the optical parameters of the optical system 10 does not drastically affect the performance of the optical system. In fact, said curves indicate that the optical system having the reduced parameters is very good and would certainly be commercially acceptable, the criterion for judging the state of correction of the aberrations being the slope of the curves away from a straight vertical line which denotes perfection. Particularly it will be observed that even when considering the full field of the optical system having the reduced parameter values, the amount of aberration is still only approximately equal to two times the Airy disc diameter.

More specifically, the above-mentioned optical parameters for one form of the present invention are given in the table of mathematical statements herebelow, wherein the designations have the same meaning as in the foregoing table, $F_I = .404K$   $R_1 = .633K$
$F_{II} = .499K$   $R_2 = .230K$
$F_{III} = .339K$   $-R_3 = .230K$
$S_1 = .560K$   $R_4 = .262K$
$S_2 = .220K$   $R_5 = \infty$
$S_3 = .672K$   $R_6 = .178K$
$S_4 = .408K$   $R_7 = \infty$
$S_5 = .339K$ $t_1 = .0151K$
$t_2 = .0387K$
$t_3 = .0521K$
$t_4 = .0336K$ Lens I (Neg. Elem.) _____ $n_D = 1.720 = 29.3$
Lens I (Pos. Elem.) _____ $n_D = 1.517 = 64.5$
Lens II _____ $n_D = 1.524 = 59.5$
Lens III _____ $n_D = 1.524 = 49.5$ With respect to the compound lens I, spherical and chromatic aberrations are preferably corrected by forming the lens as a cemented doublet. Said doublet includes said front meniscus lens element 13 having an individual negative focal length of substantially $-1.260 F_I$ and having an individual focal length for the double convex lens element 14 of substantially $+.543 F_I$. Furthermore, the front diaphragm 11 should have a diameter which is substantially $.0336K$, and the eyepiece diaphragm 15 having a diameter which is substantially $.160K$.

A preferred form of the present invention is specified numerically in the chart of constructional data appearing herebelow wherein the parameters all have the same meaning as heretofore shown in previous tables.

[Magnification = 10×    Numerical Aperture = .030]

| Lens | Focal Lengths | Radii | Thicknesses | Spaces | $n_D$ | $\nu$ |
|---|---|---|---|---|---|---|
| I | $F_I = 24.044$<br>Neg. $= -30.3$<br>Pos. $= 13.052$ | $R_1 = 37.670$<br>$R_2 = 13.677$<br>$-R_3 = 13.677$ | $t_1 = .9$<br>$t_2 = 2.3$ | $S_1 = 33.3$<br>$S_2 = 13.1$ | 1.720<br>1.517 | 29.3<br>64.5 |
| II | $F_{II} = 29.695$ | $R_4 = 15.560$<br>$R_5 = \infty$ | $t_3 = 3.1$ | $S_3 = 40.0$ | 1.524 | 59.5 |
| III | $F_{III} = 20.168$ | $R_6 = 10.568$<br>$R_7 = \infty$ | $t_4 = 2.0$ | $S_4 = 24.3$<br>$S_5 = 20.2$ | 1.524 | 59.5 |

Although but one form of this invention has been shown and described in detail, other forms are possible and changes may be made within the range of values related to the various optical parameters without departing from the spirit of the invention as claimed in the claims appended hereto.

I claim:

1. An optical system for microscopes having a magnification of substantially 10× and a numerical aperture of substantially .030, said system being well corrected for chromatic and spherical aberrations, coma, astigmatism and field curvature and consisting of
   a front compound lens designated I for forming an image of a specimen surface,
   a front diaphragm which is optically aligned with the lens I between said lens and said specimen surface at a fixed distance from said lens, the lens and diaphragm together constituting an objective,
   an eyepiece lens group optically aligned with said objective and consisting of a front substantially plano-convex lens designated II and a rear substantially plano-convex lens designated III, and further consisting of a stationary eyepiece diaphragm located between lenses II and III, the front diaphragm being located at an axial distance designated $S_1$ rearwardly from the specimen and at an axial distance designated $S_2$ in front of said lens I, the lens I consisting of a front negative meniscus lens element and a rear double convex element in contact with the negative element, the values of the optical parameters of the optical system being given in the table of mathematical statements herebelow wherein the axial distance between lens I and lens II is designated $S_3$, and the axial distance between lenses II and III is designated $S_4$, and the axial distance between lens III and said eyepiece diaphragm is designated $S_5$, the focal lengths of lenses I to III are designated $F_I$ to $F_{III}$ respectively, the successive radii of said lenses I to III are designated $R_1$ to $R_7$, the axial thicknesses of said lenses and elements being designated $t_1$ to $t_4$, and $n_D$ and $\nu$ designating respectively the refractive index and Abbe number of the glasses from which the lenses are made, the minus (−) sign accompanying the R values being applied to those radii whose center of curvature lies on the object side of the vertex of the lens surface, and K denoting half of the overall length of the optical system from said specimen surface to the rear surface of lens III, $F_I = .404K$   $R_1 = .633K$
$F_{II} = .499K$   $R_2 = .230K$
$F_{III} = .339K$   $-R_3 = .230K$
$S_1 = .560K$   $R_4 = .262K$
$S_2 = .220K$   $R_5 = \infty$
$S_3 = .672K$   $R_6 = .178K$
$S_4 = .408K$   $R_7 = \infty$
$S_5 = .339K$ $t_1 = .0151K$
$t_2 = .0387K$
$t_3 = .0521K$
$t_4 = .0336K$ Lens I (Neg. Elem.) _____ $n_D = 1.720$   $\nu = 29.3$
Lens I (Pos. Elem.) _____ $n_D = 1.517$   $\nu = 64.5$
Lens II _____ $n_D = 1.524$   $\nu = 59.5$
Lens III _____ $n_D = 1.524$   $\nu = 59.5$ 2. An optical system for microscopes having a magnification of substantially 10× and a numerical aperture of substantially .030, said system being well corrected for chromatic and spherical aberrations, coma, astigmatism and field curvature and consisting of
   a front compound lens designated I for forming an image of a specimen surface,
   a front diaphragm which is optically aligned with the lens I between said lens and said specimen surface at a fixed distance from said lens, the lens and diaphragm together constituting an objective,
   an eyepiece lens group optically aligned with said objective and consisting of a front substantially plano-convex lens designated II and a rear substantially plano-convex lens designated III, and further consisting of a stationary eyepiece diaphragm located between lenses II and III, the front diaphragm being located at an axial distance designated $S_1$ rearwardly from the specimen and at an axial distance designated $S_2$ in front of said lens I, the lens I consisting of a front negative meniscus lens element and a rear double convex element in contact with the negative element, the values of the optical parameters of the optical system being given in the chart of numerical values herebelow wherein the axial distance between lens I and lens II is designated $S_3$, and the axial distance between lenses II and III is designated $S_4$, and the axial distance between lens III and said eyepiece diaphragm is designated $S_5$, the focal lengths of lenses I to III are designated $F_I$ to $F_{III}$ respectively, the successive radii of said lenses I to III are designated $R_1$ to $R_7$, the axial thicknesses of said lenses and elements being designated $t_1$ to $t_4$, and $n_D$ and $\nu$ designating respectively the refractive index and Abbe number of the glasses from which the lenses are made, the minus (—) sign accompanying the R values being applied to those radii whose center of curvature lies on the object side of the vertex of the lens surface, and K denoting half of the overall length of the optical system from said specimen surface to the rear surface of lens III,

[Magnification=10×    Numerical Aperture=.030]

| Lens | Focal Lengths | Radii | Thickness | Spaces | $n_D$ | $\nu$ |
|---|---|---|---|---|---|---|
| | | | | $S_1$=33.3 | | |
| | | | | $S_2$=13.1 | | |
| I | $F_I$=24.044 | $R_1$=37.670 | $t_1$=.9 | | 1.720 | 29.3 |
| | Neg.=−30.3 | $R_2$=13.677 | $t_2$=2.3 | | 1.517 | 64.5 |
| | Pos.=13.052 | −$R_3$=13.677 | | $S_3$=40.0 | | |
| II | $F_{II}$=29.695 | $R_4$=15.560 | $t_3$=3.1 | | 1.524 | 59.5 |
| | | $R_5$=∞ | | $S_4$=24.3 | | |
| | | | | $S_5$=20.2 | | |
| III | $F_{III}$=20.168 | $R_6$=10.568 | $t_4$=2.0 | | 1.524 | 59.5 |
| | | $R_7$=∞ | | | | |

No references cited.

JEWELL H. PEDERSEN, *Primary Examiner*.

JOHN K. CORBIN, *Examiner*.

R. J. STERN, *Assistant Examiner*.